US012770607B1

(12) United States Patent
MacTiernan et al.

(10) Patent No.: US 12,770,607 B1
(45) Date of Patent: Oct. 20, 2026

(54) AUTOMATED GENERATION OF AUDIO SEGMENTS FROM ITEM DATA

(71) Applicant: Amazon Technologies, Inc., Seattle, WA (US)

(72) Inventors: Daniel Neil MacTiernan, Ocean City, NJ (US); Ethan Patrick Fortner, Austin, TX (US); Rohit Bhatia, San Carlos, CA (US); Milton Christ Georges, Cranbury, NJ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 579 days.

(21) Appl. No.: 18/186,530

(22) Filed: Mar. 20, 2023

(51) Int. Cl.
*G10L 13/027* (2013.01)
*G06F 3/16* (2006.01)
*G06F 40/58* (2020.01)
*G06Q 30/0282* (2023.01)
*G10L 13/033* (2013.01)

(52) U.S. Cl.
CPC ............ *G10L 13/027* (2013.01); *G06F 3/167* (2013.01); *G06F 40/58* (2020.01); *G06Q 30/0282* (2013.01); *G10L 13/033* (2013.01)

(58) Field of Classification Search
CPC ..... G10L 13/027; G10L 13/033; G06F 3/167; G06F 40/58; G06Q 30/0282
USPC .......................................................... 704/258
See application file for complete search history.

(56) References Cited

U.S. PATENT DOCUMENTS

| | | | | |
|---|---|---|---|---|
| 8,726,312 | B1 * | 5/2014 | Hewinson | H04N 21/2668 725/35 |
| 9,965,470 | B1 * | 5/2018 | Fox | G06F 9/00 |
| 10,514,888 | B1 * | 12/2019 | Rodgers | H04R 29/001 |
| 10,528,977 | B1 * | 1/2020 | Jogia | G06F 3/167 |
| 11,087,379 | B1 * | 8/2021 | Verley, IV | G06Q 20/12 |
| 11,348,160 | B1 * | 5/2022 | Shukla | G06Q 30/0281 |
| 11,586,524 | B1 * | 2/2023 | Jain | G06F 11/3058 |
| 11,609,738 | B1 * | 3/2023 | Imbruce | G06F 16/64 |
| 11,676,169 | B1 * | 6/2023 | Bhow | G06N 20/00 705/14.25 |
| 11,741,996 | B1 * | 8/2023 | Ramesh | G10L 13/02 386/285 |
| 11,789,837 | B1 * | 10/2023 | Jain | G06F 11/3006 709/224 |
| 12,184,811 | B1 * | 12/2024 | Byrd | G10L 15/26 |
| 12,248,384 | B1 * | 3/2025 | Jain | G06F 11/3006 |
| 2003/0236711 | A1 * | 12/2003 | Deguchi | G06Q 30/0601 705/26.1 |
| 2004/0267611 | A1 * | 12/2004 | Hoerenz | G06Q 30/0241 705/14.13 |
| 2006/0271434 | A1 * | 11/2006 | Ruttenberg | G06Q 30/0264 705/14.64 |

(Continued)

*Primary Examiner* — Thuykhanh Le
(74) *Attorney, Agent, or Firm* — Perilla Knox & Hildebrandt LLP; Thomas B. Hildebrandt

(57) ABSTRACT

Disclosed are various embodiments for automatically generating audio segments from item data. In one embodiment, an audio segment discussing an item offered by an entity via an electronic commerce system is automatically generated. The audio segment is generated based at least in part on data associated with the item in the electronic commerce system. A user interface is generated that facilitates manually reviewing the audio segment by the entity. The audio segment is inserted in media content in response to an approval of the audio segment by the entity via the user interface.

19 Claims, 6 Drawing Sheets

(56) References Cited

U.S. PATENT DOCUMENTS

2008/0039010 A1* 2/2008 Vance .................... G06Q 30/02 455/3.06
2009/0005893 A1* 1/2009 Sugii ........................ H04B 3/54 700/94
2009/0157449 A1* 6/2009 Itani ................... G06Q 30/0201 705/7.29
2010/0036717 A1* 2/2010 Trest .................. G06Q 30/0251 705/14.1
2011/0161162 A1* 6/2011 Ketchum ............... G06Q 30/02 705/14.43
2011/0264640 A1* 10/2011 Fontoura ............ G06Q 30/0277 707/706
2012/0158504 A1* 6/2012 Kumar ............... G06Q 30/0269 705/14.53
2013/0073388 A1* 3/2013 Heath .................... G06Q 10/40 705/14.53
2013/0117267 A1* 5/2013 Buryak ................. G06F 16/285 707/737
2015/0030151 A1* 1/2015 Bellini ................. G06Q 10/063 379/265.06
2015/0032551 A1* 1/2015 Ekambaram ....... G06Q 30/0271 705/14.67
2015/0206181 A1* 7/2015 Parundekar ........ G06Q 30/0251 705/14.49
2015/0289120 A1* 10/2015 Harber ................... G06Q 10/40 455/414.3
2016/0027046 A1* 1/2016 Huang ............... G06Q 30/0201 705/14.49
2016/0062954 A1* 3/2016 Ruff ...................... G06F 40/205 715/249
2016/0092932 A1* 3/2016 Bharath .................. G10L 13/00 705/14.67
2016/0092936 A1* 3/2016 Bharath ............. G06Q 30/0269 705/14.66
2016/0110794 A1* 4/2016 Hsiao .................... G06F 18/214 705/26.7
2016/0189222 A1* 6/2016 Richman ............... H04L 65/612 705/14.55
2016/0239876 A1* 8/2016 Ales ........................ G06F 3/165
2016/0379274 A1* 12/2016 Irwin ................. G06Q 30/0271 705/14.67
2017/0206200 A1* 7/2017 Bajpai ............... G06F 16/24578
2018/0060311 A1* 3/2018 Robinson ................ G10L 15/26
2018/0122361 A1* 5/2018 Silveira Ocampo ......................... G10L 13/0335
2018/0144346 A1* 5/2018 Yu ........................... G06F 21/32
2018/0225519 A1* 8/2018 Chen ...................... G06V 20/47
2019/0213900 A1* 7/2019 Erickson .................. G09B 7/02
2019/0238954 A1* 8/2019 Dawson ............. H04N 1/00177
2019/0266643 A1* 8/2019 Cho ......................... B60Q 1/50
2019/0372833 A1* 12/2019 Kline .................... G06F 16/288
2020/0058288 A1* 2/2020 Lin .......................... G06F 9/451
2020/0090214 A1* 3/2020 Tushinskiy ............. G10L 15/22
2020/0202391 A1* 6/2020 Li ...................... G06Q 30/0247
2020/0234119 A1* 7/2020 Shi ....................... G06N 3/0464
2020/0296451 A1* 9/2020 Hassler .............. H04N 21/2402
2020/0372547 A1* 11/2020 Deole ...................... G06F 3/167
2021/0024066 A1* 1/2021 Hornstein ........... B60W 50/085
2021/0049006 A1* 2/2021 Tommasi ............ G06F 9/44505
2021/0118036 A1* 4/2021 Jiang ...................... G06N 20/00
2021/0312948 A1* 10/2021 Haley ................ H04N 21/2743
2021/0383252 A1* 12/2021 Arnold .................. G06F 16/954
2021/0409542 A1* 12/2021 Chavez ............... H04M 3/5166
2022/0076098 A1* 3/2022 Wilson ..................... G06N 3/02
2022/0076669 A1* 3/2022 Hatambeiki ..... H04N 21/42203
2022/0124416 A1* 4/2022 Topalli ............. H04N 21/44008
2022/0138797 A1* 5/2022 Wedel ................ G06Q 30/0261 705/14.5
2022/0148580 A1* 5/2022 Kumar .................... G06F 18/29
2022/0215425 A1* 7/2022 Hatambeiki ....... G06Q 30/0269
2022/0222451 A1* 7/2022 Shin ........................ G10L 15/04
2022/0253882 A1* 8/2022 Cooper .............. G06Q 30/0214
2022/0366277 A1* 11/2022 DeFilippo .............. G06N 20/00
2022/0399008 A1* 12/2022 Vempaty .................. G06N 5/04
2022/0413932 A1* 12/2022 Telang .................... G06F 9/505
2023/0040015 A1* 2/2023 Rose ........................ G10L 13/02
2023/0058658 A1* 2/2023 Trueba .................... G10L 25/18
2023/0077130 A1* 3/2023 Matsuoka ............. G06F 9/4831
2023/0107776 A1* 4/2023 Dion ..................... G06F 16/639 709/231
2023/0113602 A1* 4/2023 Rafferty .............. G06F 21/6245 726/26
2023/0135254 A1* 5/2023 Bakhchevan ...... G06Q 30/0271 725/12
2023/0217060 A1* 7/2023 Cosmo ............ H04N 21/43078 725/87
2023/0274089 A1* 8/2023 Tunstall-Pedoe ..... G06F 40/279 704/2
2023/0280966 A1* 9/2023 Imbruce ................ G06F 16/638 704/235
2023/0351477 A1* 11/2023 Cornacchia ........ G06Q 30/0282
2023/0359947 A1* 11/2023 Grigoriev ............ G06Q 10/025
2024/0005355 A1* 1/2024 Patel .................. G06Q 30/0244
2024/0013770 A1* 1/2024 Trueba .................... G10L 25/18
2024/0046327 A1* 2/2024 Zhu .................... G06Q 10/0837
2025/0133268 A1* 4/2025 Gokou ............. H04N 21/43074
2025/0182174 A1* 6/2025 McDaniel .............. B33Y 50/02

* cited by examiner

AUTOMATED GENERATION OF AUDIO SEGMENTS FROM ITEM DATA

BACKGROUND

Individuals may be presented with a variety of audio segments in their day-to-day activities. For example, a person may listen to streaming music or podcasts, and between the music and/or speech content, various audio segments may announce sponsors, discuss product offerings, include calls to action, and so forth. In another example, audio segments are presented in the operation of a voice interface device, such as between content responsive to user commands or questions. Audio segments are typically costly to create, including voice talent and production fees, which limits participation to larger organizations with higher budgets.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to automated generation of audio segments from item data. Many suppliers who could potentially benefit from producing audio segments about their catalog may not consider audio segments due to high production costs. Traditionally, audio segments are produced by agencies, and costs for copywriting, voice talent, and production are beyond what many small business brands can afford. However, it is very common that small business brands lack consumer awareness. Not enough consumers have heard about their businesses or know enough to formulate a search query. Existing approaches to specifically target consumers for their interest in and possible conversion with respect to particular items, such as generating sponsored listings to be included in search results, are effective and cost efficient for small business merchants, but these approaches may not be effective and/or cost efficient for building general brand awareness.

Various embodiments of the present disclosure introduce automated approaches for generating audio segments of a promotional nature using existing item data sources. Such item data sources may include item detail pages and item reviews on an electronic commerce system. In some cases, information from the merchant's own web site may also be used. A machine learning model may be used to continuously improve the automated audio segment generation based on information such as the performance of the audio segments in driving consumer conversion such as subsequent brand searches, item searches, item detail page views, item purchases, and so on. A proposed audio segment may be presented to a reviewing user for approval or modification before the audio segment is distributed, and the approval and modification process may also create signals for improving the machine learning model.

As one skilled in the art will appreciate in light of this disclosure, certain embodiments may be capable of achieving certain advantages, including some or all of the following: (1) improving the performance and capability of computing systems by using machine learning to automatically generate and optimize audio segments; (2) improving the computer user experience by facilitating brand awareness and discovery for smaller merchants using audio segments; (3) improving the flexibility of computing systems by allowing for audio segments to be generated in multiple languages and in different voices; (4) improving the usability of computing systems by introducing graphical user interfaces to review, approve, and/or modify automatically generated audio segments; and so forth.

Figure 1:
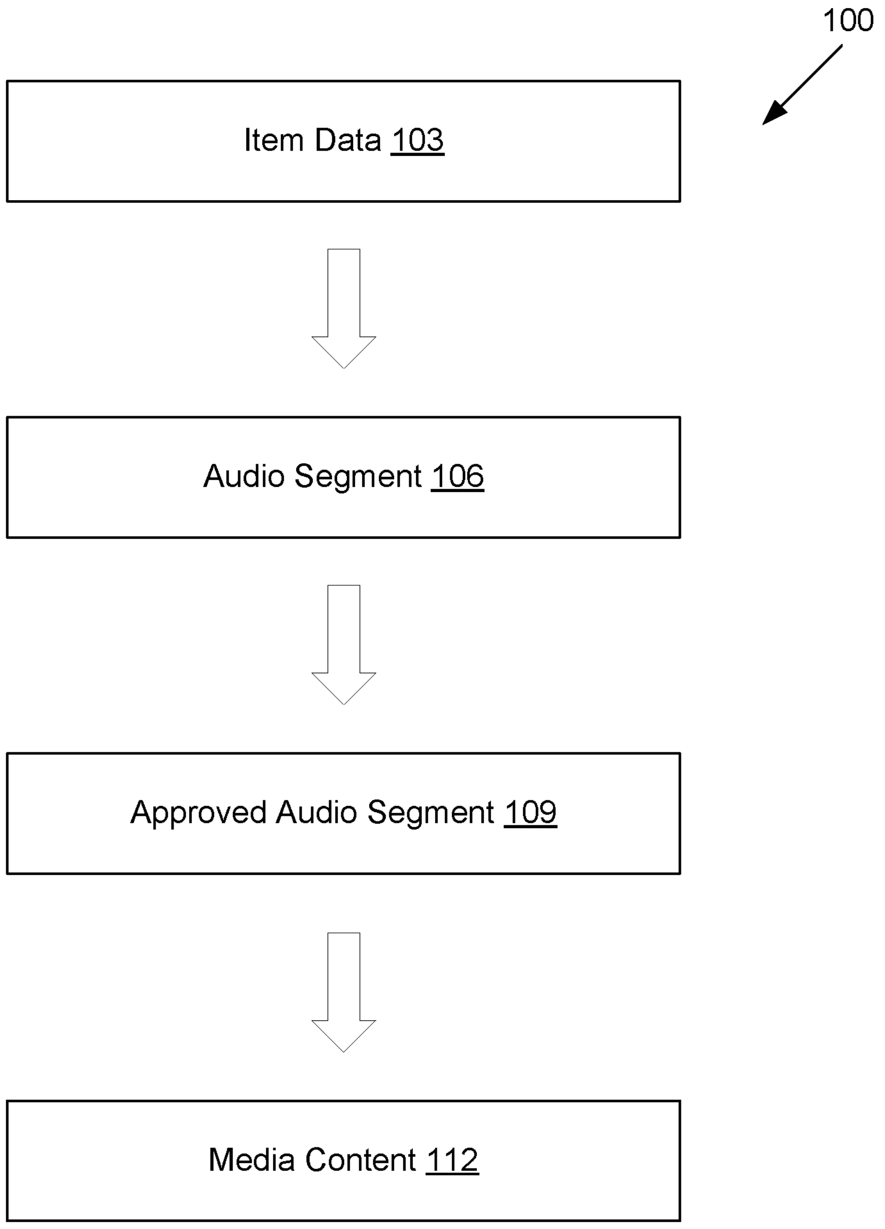
FIG. 1 illustrates an example scenario in which an audio segment is generated from item data in accordance with one or more embodiments of the present disclosure.

FIG. 1 illustrates an example scenario 100 in which an audio segment is generated from item data in accordance with one or more embodiments of the present disclosure. First, item data 103 may be obtained from an electronic commerce system or other item catalog. The item data 103 includes data describing an item offered for order through the electronic commerce system. In various examples, the item may comprise a product, a service, a download, a digital content item, or another type of item, the item may be offered for order through one or more merchants via the electronic commerce system.

Next, an audio segment 106 is automatically generated based at least in part on the item data 103 and the output of a machine learning model trained to generate the audio segments 106. For example, the audio segment 106 may comprise a fifteen-second announcement regarding the item. Various information from the item data 103, such as words, descriptions, images, color schemes or other look-and-feel attributes, may influence the generation of the audio segment 106. in generating the audio segment 106, various characteristics of the audio segment 106 may be automatically determined based on the machine learning model. Non-limiting examples of such characteristics may include a script for the audio segment 106, a type of computer-generated voice used in the audio segment 106, a type of background audio used in the audio segment 106, specific calls to action, and so on.

The audio segment 106 is then submitted for manual review via a user interface. A merchant or other entity offering the item for order via the electronic commerce system may be presented with an option to run the audio segment 106 in connection with digital streaming content in order to raise awareness of the item, the brand of the item, or an online store of the merchant or other entity. In one scenario, the merchant or other entity may disapprove of the audio segment 106, and choose not to run the audio segment 106. In another scenario, the merchant or other entity may submit changes to characteristics of the audio segment 106, such as changing the type of computer generated voice, altering the script text, modifying the type of background audio, modifying the length, and other changes, and yet another scenario, the merchant or other entity may approve the audio segment 106, and in such cases the approved audio segment 109 may be submitted for publication or inclusion in one or more media content 112, such as a video stream that includes audio, or an audio stream. In a scenario where the media content 112 is a video stream, the media content 112 may include an accompanying image (e.g., a merchant logo or picture of the item) that is shown while the approved audio segment 109 is playing.

Once approved, the approved audio segment 109 may be inserted into the media content 112 being streamed to user devices associated with user accounts of specifically targeted users. In other scenarios, the media content 112 including the approved audio segment 109 may be broadcast to anonymous or users associated with limited demographic information, similarly to how advertising content is transmitted over broadcast media. After the approved audio segment 109 is presented to users, it may be determined whether the users engaged with content associated with the merchant or other entity and/or ordered the item discussed in the approved audio segment 109. This conversion information may be used as feedback to the machine learning model to better train the machine learning model to generate audio segments 106 that are effective in their purpose of driving item conversion or general brand/merchant awareness.

Figure 2:
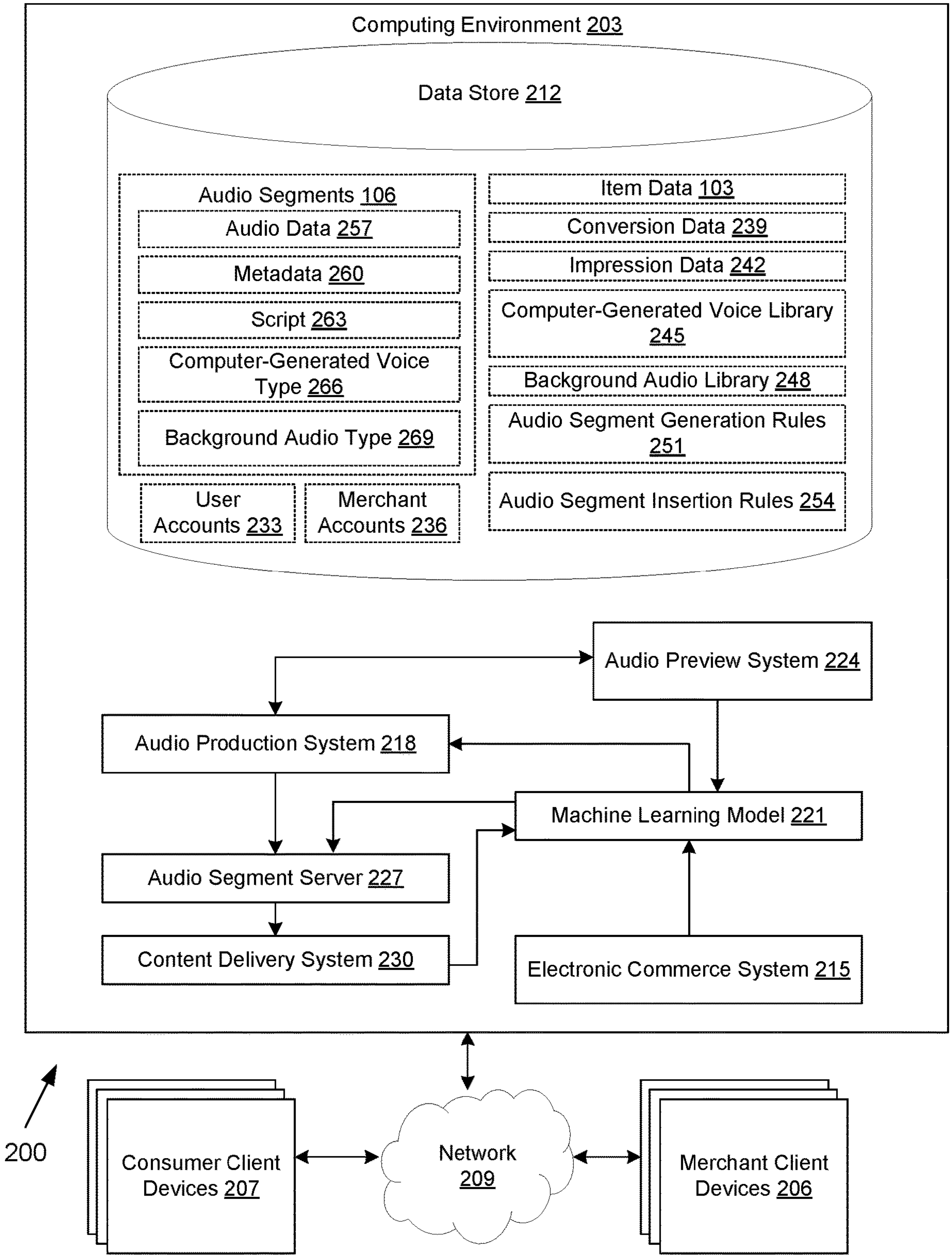
FIG. 2 is a schematic block diagram of a networked environment according to various embodiments of the present disclosure.

With reference to FIG. 2, shown is a networked environment 200 according to various embodiments. The networked environment 200 includes a computing environment 203, which may be in data communication with one or more merchant client devices 206 and one or more consumer client devices 207 via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce system 215, an audio production system 218, a machine learning model 221, an audio preview system 224, an audio segment server 227, a content delivery system 230, and other applications, services, processes, systems, engines, or functionality not discussed in detail herein. The electronic commerce system 215 is executed to generate network pages or other forms of network content that allow users to browse for, search for, and place orders for items that may be offered by a variety of merchants. For example, when a user searches for a search query via the electronic commerce system 215, the user may be presented with a list of search results corresponding to individual items that are offered for order by merchants through the electronic commerce system 215. When a user selects a particular search result in the listing, the electronic commerce system 215 may generate and send an item detail page providing more detailed information about the item to the user's device.

The audio production system 218 is executed to generate a fully completed, ready-to-distribute audio segment 106 that discusses an item, brand, or merchant. In this regard, the audio production system 218 may automatically generate a script for the audio segment 106, automatically select a particular computer-generated voice type from a plurality of computer-generated voice types to read the script, automatically select a type of background audio or music for the audio segment 106, and so forth, from the input of the item data 130 and/or a network site or network page associated with the merchant.

In generating the audio segment 106, the audio production system 218 may use a machine learning model 221 that is trained to generate the audio segment 106 based upon the effectiveness of the generated audio segments 106 (e.g., in terms of conversion) as well as whether a merchant approves a generated audio segment 106 to run, or whether the merchant manually changes one of the automatically generated attributes of the audio segment 106. The machine learning model 221 (or models) may also be trained to identify which users should be presented with particular audio segments 106 or in which media content 112 the audio segment 106 should be included.

The audio preview system 224 is executed to generate one or more user interfaces for merchant users to manually review the automatically generated audio segments 106. The users can either approve the generated audio segments 106 for distribution in media content 112, or the users can disapprove the generated audio segments 106. In cases of disapproval, the users may make changes to various characteristics of the audio segments 106 before the audio segments 106 are distributed, such as manual modifications to the script, changes in the type of voice used, changes in the background audio, and so forth. Alternatively, the users may request that the audio production system 218 try again and generate a different audio segment 106 for review via the audio preview system 224.

The audio segment server 227 is executed to insert approved audio segments 109 into media content 112 that is targeted to specific users who are likely to order the item discussed in the approved audio segment 109. In this regard, the audio segment server 227 may identify particular media content 112 into which the audio segment 106 should be inserted based at least in part on characteristics of the media content 112 in comparison to characteristics of the items. For example, media content 112 that is a podcast discussing home renovations may be an ideal media content 112 for insertion of an audio segment 106 discussing an improved plumbing tool. Likewise, to the extent that the receiving users can be identified, media content 112 that is being presented to users who are more likely to order the items may be selected based upon the characteristics and/or demographics of the users to whom they are presented as well as the characteristics of the item discussed in the audio segment 106. For example, a user who is identified as having an interest in do-it-yourself home improvement projects may be identified as an ideal target for the audio segment 106 discussing the improved plumbing tool. Consequently, the audio segment 106 may be inserted into media content 112 consumed by the targeted user, even if the content of the media content 112 is not related directly to the topic of home improvement. The audio segment server 227 may record when an audio segment 106 is presented to a user as an impression, so that the effectiveness of the targeting or the effectiveness of the audio segment 106 itself can be assessed, such as when the user later orders the item discussed in the audio segment 106 from the electronic commerce system 215.

The content delivery system 230 is executed to transmit media content 112 to consumer client devices 207 associated with user accounts. The media content 112 may comprise streaming music, podcasts, live performances, responses to voice commands received from a voice interface device, video content, and other media content. The content delivery system 230 includes audio segments 106 in the media content 112 based upon direction from the audio segment server 227.

In some cases, the content delivery system 230 is operated by the same entity that operates the electronic commerce system 215. In other cases, the electronic commerce system 215 is operated by a different entity from the content delivery system 230. Likewise, in some cases, the same entity operates both the electronic commerce system 215 and the audio segment server 227, while in other cases different entities operate the electronic commerce system 215 and the audio segment server 227. Further, the audio segment server 227 and the content delivery system 230 may be operated by a same entity or different entities. If any of these components are operated by different entities, the computing environment 203 may correspond to a plurality of computing environments 203 in data communication via the network 209.

The data stored in the data store 212 includes, for example, what are more audio segments 106, one or more user accounts 233, one or more merchant accounts 236, item data 103, conversion data 239, impression data 242, a computer generated voice library 245, a background audio library 248, one or more audio segment generation rules 251, one or more audio segment insertion rules 254, and potentially other data.

The audio segments 106 are data objects corresponding to an announcement or discussion of an item or items offered by a merchant via the electronic commerce system 215. Data associated with an audio segment 106 may include, for example, audio data 257, metadata 260, a script 263, a computer-generated voice type 266, a background audio type 269, or other data. The audio data 257 corresponds to the actual audio that is rendered by the audio production system 218, incorporating elements of computer-generated voices, sampled voices of real customers from customer reviews of the item (with permission of those customers), and/or background audio and sounds. The audio data 257 may be in a variety of formats such as WAV or pulse code modulation (PCM), MP3, advanced audio coding (AAC), OGG VORBIS, or another audio format. In various examples, the audio data 257 may be stereophonic or monophonic.

The metadata 260 may include data such as item name, item network page uniform resource locator (URL), merchant name, logo, and so on, such that if the consumer client device 207 has a visual component, the metadata 260 may be used in the visual interface to accompany and identify the audio segment 106 when the audio segment 106 is played. In some cases, a user may be able to select a graphical user interface component to cause a URL associated with the item to be loaded on the consumer client device 207. Alternatively, if the consumer client device 207 is a voice interface device, the user may give a command to add the item to a shopping list or obtain additional information about the item based at least in part on the metadata 260 accompanying the audio segment 106.

The script 263 is automatically generated by the audio production system 218 to discuss or announce the item. In some cases, the script 263 may include taglines and one or more calls to action, such as, for example, providing a website URL and encouraging the user to visit the website URL, or encouraging the user to say a particular voice command that causes a voice interface device to add the item to a shopping list associated with the user. The script 263 is generated using words from or otherwise is based at least in part on the item data 103, such as an item name, an item description, customer reviews of the item, item photos, item features, item pricing, and so on. In some cases, the script 263 is generated based at least in part on network page or network site associated with the merchant. The script 263 may be generated based upon a particular target length, such as, for example, 15 seconds, 30 seconds, or another target duration. In some cases, the script 263 may be translated to a target language from a different source language in the item data 103 using machine translation.

The audio segment 106 is associated with a particular computer-generated voice type 266. The particular computer-generated voice type 266 may be selected by the audio production system 218 based at least in part on the type of item discussed and the demographics of the users who are likely to order the item. Characteristics of the computer-generated voice that may vary may include gender, age, regional accents, speed of delivery, and so on. For example, a computer-generated voice of a child may be used to discuss an item that is a children's toy. The computer-generated voice may be variously selected based upon goals of authoritative delivery, warm delivery, regional delivery, and so forth.

The background audio type 269 may indicate a particular type of background music, sound effects, or other audio that is mixed with the audio segment 106 to augment the delivery. The background audio may serve to communicate a certain tone or feeling with respect to the item discussed, which may be automatically selected based at least in part upon information from the item data 130. In some cases, multiple types of background audio may be used in a single audio segment 106, or the background audio may fade in or fade out. As non-limiting examples, background audio types 269 may include serious sounding piano notes, a peppy jingle with light guitar notes, fun banjo notes, and so on. In some cases, an audio segment 106 may have no background audio in order to convey a certain tone or feeling.

The user accounts 233 correspond to accounts of users with the electronic commerce system 215 and/or the content delivery system 230. In some cases, a single user account 233 may be used by a user to access both the electronic commerce system 215 and the content delivery system 230. If different user accounts 233 are used by the electronic commerce system 215 and the content delivery system 230, there may be a way to correlate the identity of the user among the different accounts, in order to associate an impression of an audio segment 106 via the content delivery system 230 with a conversion recorded by the electronic commerce system 215. For example, cookie data may enable correlation of the user accounts 233. In other scenarios, the conversions may be anonymized with respect to the impressions, so inferences may need to be made (e.g., by a machine learning model) to assess the effectiveness of impressions of the audio segment 106 in driving conversions. The user accounts 233 may be associated with various characteristics, such as interests, demographics, income, location, and so forth, which may assist in targeting the audio segments 106 to users that would be most interested in the items or merchants discussed in the audio segments 106.

The merchant accounts 236 are accounts of merchant users that may be utilized to create an item catalog via the electronic commerce system 215, upload item data 103, and to request creation of one or more audio segments 106 using a merchant client device 206. For example, a user associated with a merchant account 236 may express an interest in creating an audio segment 106 for a particular item via a catalog management user interface or via an advertising management user interface associated with the electronic commerce system 215. Subsequently, an audio segment 106 may be automatically generated by the audio production system 218, and then presented for manual review by the merchant user via the audio preview system 224.

The conversion data 239 tracks conversions or orders of items that are discussed in audio segments 106. For example, the conversion data 239 may be populated by the electronic commerce system 215 as the orders are received. In some cases, the conversions may be considered as additional actions short of placing an order such as accessing an item detail page or adding an item to a shopping list. The conversions in the conversion data 239 may be associated with identifiers of user accounts 233 that initiated the conversion, day and time of the conversion, whether an audio segment 103 generated a referral via a referrer URL to the electronic commerce system 215 to produce the conversion, and or other information. If the conversion data 239 is directly correlated with the impression data 242, deterministic attribution can be used in determining the effectiveness of the audio segments 106. By contrast, if the conversion data 239 is not directly correlated with impression data 242 (e.g., in the case of broadcasting to anonymous users), probabilistic models may be used to assess effectiveness.

The impression data 242 tracks impressions of audio segments 106 to record when the audio segments 106 are presented to consumer client devices 207 associated with user accounts 233. For example, the impression data 242 may record an identifier of a user account 233 to which the audio segment 106 is presented, along with day and time and potentially other metadata, such as whether the audio segment 106 was paused, whether the audio segment 106 was skipped, and or other metadata.

The computer-generated voice library 245 includes a variety of different computer-generated voices that can be selected by the audio production system 218 or manually by a merchant user in order to synthesize a reading of the script 263 for the audio segment 106. The voices in the computer-generated voice library 245 may be specific to a particular language. The background audio library 248 includes a variety of background audio samples such as music that can be selected by the audio production system 218 or manually by a merchant user to be mixed with the audio segment 106.

The audio segment generation rules 251 control generation of audio segments 106 by the audio production system 218. In some cases, the audio segment generation rules 251 may be partially or wholly generated by the machine learning model 221. In other cases, one or more of the audio segment generation rules 251 may be manually curated by an administrative user. In some cases the audio segment generation rules 251 may be manually curated as an initial configuration that may be updated or modified by the machine learning model 221 as the machine learning model 221 is trained on additional information or feedback to better produce the audio segments 106. For example, the audio segment generation rules 251 may define how item descriptions may be extracted and used in connection with one or more templates to create the script 263. In another example, the audio segment generation rules 251 may define how relatively popular portions of customer reviews are extracted for use in the script 263, or to extract words or phrases from customer review for the script 263 based at least in part upon how frequently the words or phrases appear in the customer reviews.

The audio segment insertion rules 254 may control which audio segments 106 are presented to which users based at least in part upon characteristics of those users, as well as which audio segments 106 are included in particular media content 112 based at least in part upon characteristics of the media content 112. The audio segment insertion rules 254 may be manually curated or may be automatically generated by the machine learning model 221. In some cases, the audio segment insertion rules 254 are initially configured by an administrative user and then updated over time by the machine learning model 221 based at least in part upon training from effectiveness as defined by a conversion following an impression of the audio segment 106.

The merchant client devices 206 and the consumer client devices 207 are representative of a plurality of client devices that may be coupled to the network 209. The merchant client devices 206 and the consumer client devices 207 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The merchant client devices 206 and the consumer client devices 207 may include a display such as, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some embodiments, the merchant client devices 206 and the consumer client devices 207 may lack a display (e.g., in the case of a voice interface device). In particular, the merchant client devices 206 and the consumer client devices 207 may include or communicate with an audio device in order to play back the audio segments 106.

The merchant client devices 206 and the consumer client devices 207 may be configured to execute various applications such as a client application and/or other applications. The client application may be executed in the merchant client devices 206 and the consumer client devices 207, for example, to access network content served up by the computing environment 203 and/or other servers, thereby rendering a user interface on the display. To this end, the client application may comprise, for example, a browser, a dedicated application, etc., and the user interface may comprise a network page, an application screen, etc. The merchant client devices 206 and the consumer client devices 207 may be configured to execute applications beyond the client application such as, for example, email applications, social networking applications, word processors, spreadsheets, music or audio players, and/or other applications.

Figure 3:
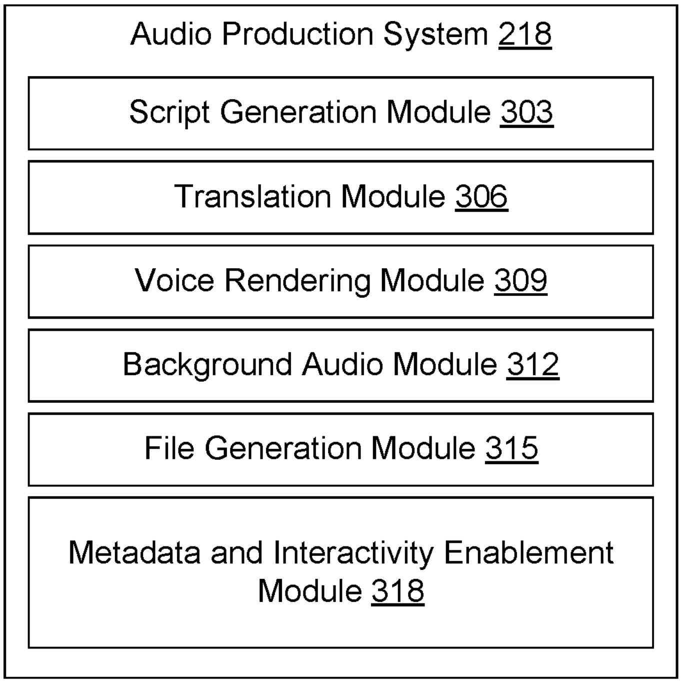
FIG. 3 is a diagram of one example of various components of the audio production system according to one or more embodiments of the present disclosure.

Turning now to FIG. 3, shown is a diagram of one example of various components of the audio production system 218 according to one or more embodiments. The audio production system 218 may include, for example, a script generation module 303, a translation module 306, a voice rendering module 309, a background audio module 312, a file generation module 315, a metadata and interactivity enablement module 318, and/or other components.

The script generation module 303 may employ chatbot technology to write a script 263 for an audio segment 106 discussing an item, such that the script 263 is timed to be read out at the desired audio segment duration, such as 15 seconds or another duration. The script generation module 303 may operate based on the audio segment generation rules 251 to extract words and phrases from the item data 103 and/or the network sites or network pages of the merchant.

The translation module 306 is executed to translate item data 103 from a source language to a target language corresponding to a targeted audience for the audio segment 106. For example, the translation module 306 may employ machine translation technology. In some embodiments, the translation module 306 may translate the script 263 from one language to another.

The voice rendering module 309 generates a voice track for the given script 263 using the selected computer-generated voice type 266 using text-to-speech technology. In some cases, the voice track includes multiple voices if the script 263 includes multiple speakers. The voices may be selected from the computer-generated voice library 245. The background audio module 312 generates background audio to be mixed with the voice track in order to set the vibe and tone of the message embodied in the audio segment 106, which helps the audio segment 106 resonate with its audience. The background audio may be selected from the background audio library 248.

The file generation module 315 performs mastering and audio file creation functions for the audio segments 106. For example, the file generation module 315 may adjust the volume and fading, and then combine the different tracks (e.g., voice and background audio) to generate a single audio file. In various non-limiting examples, a first audio segment 106 may have no fades and may have a volume 10% louder than typical to emphasize an urgent vibe, a second audio segment 106 may have a fade in and a fade out for background audio, and a third audio segment 106 may have a volume 10% lower than typical to emphasize a soothing vibe, and so on.

The metadata and interactivity enablement module 318 adds metadata 260 to the audio segment 106. The metadata 260, such as item name, merchant name, website URL, etc., can be used in connection with a visual screen of the consumer client device 107 to present information to the end user while the audio segment 106 is playing. Additionally, the metadata and interactivity enablement module 318 can add interactivity information so that if the consumer client device 107 supports interactivity (e.g., voice interface devices), as a non-limiting example, the audio segment 106 could prompt the user to give a command to the device to add the item to a shopping list.

In some embodiments, the metadata and interactivity enablement module 318 may generate a conversational skill for a voice interface device. For example, the conversational skill may enable the user to ask for more information about the item discussed in the audio segment 106, or to ask more information about the merchant. In some cases, the conversational skill may be a single-turn conversational skill, meaning that the voice interface device provides one response to a voice command, such as a question about the item. In other cases, the conversational skill may be a multi-turn conversational skill, where a user can ask follow-up questions or provide follow-up voice commands. A call to action for the user to use the conversational skill may be included within the audio segment 106. The conversational skill may be generated automatically from the item data 103 and/or the merchant's website data based at least in part on a machine learning model 221 in a similar manner to the script 263.

Figure 4:
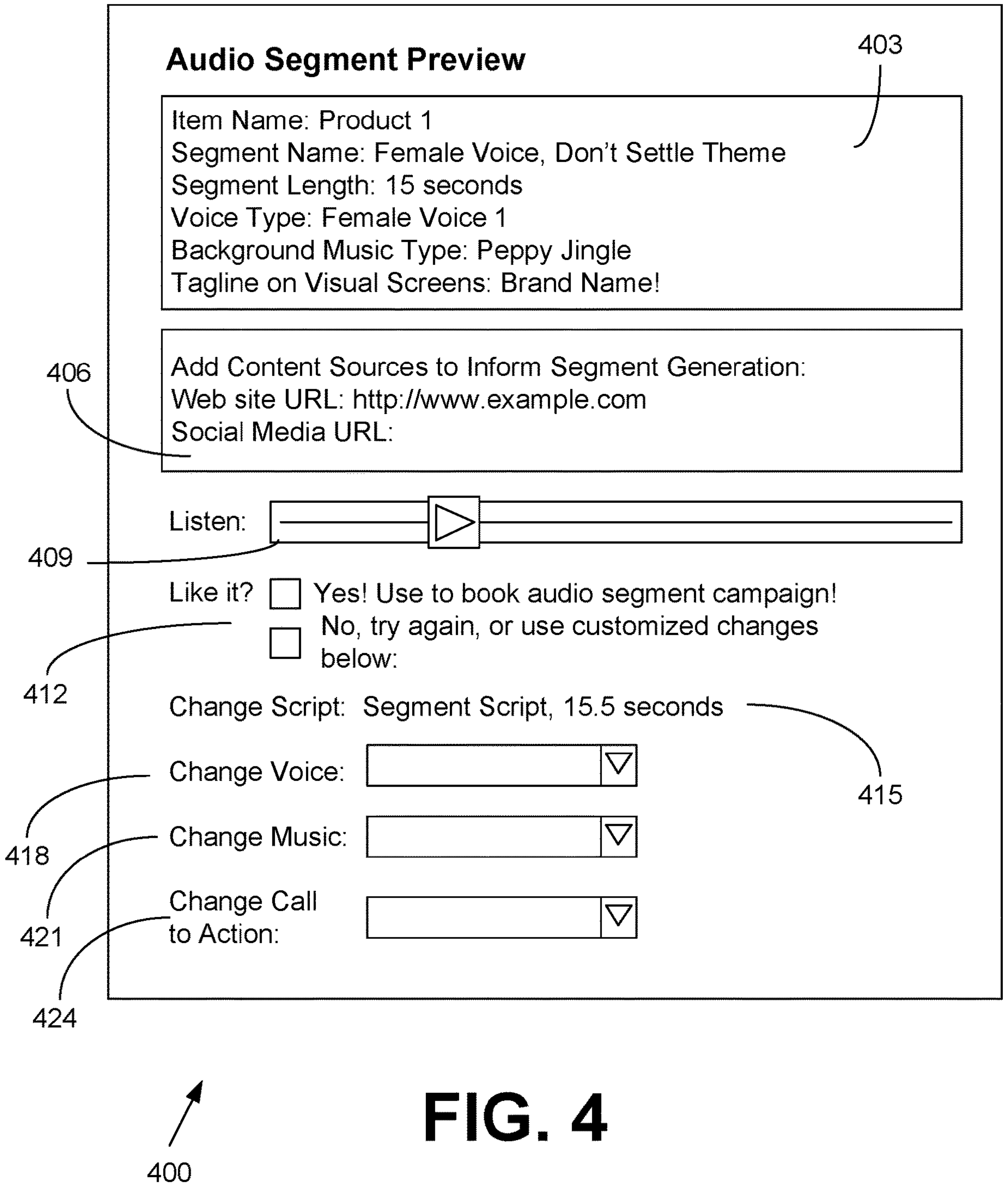
FIG. 4 is a drawing of one example of a user interface generated by the audio preview system according to one or more embodiments of the present disclosure.

FIG. 4 is a drawing of one example of a user interface 400 generated by the audio preview system 224 according to one or more embodiments. The user interface 400 presents the automatically generated audio segment 106 to the merchant user logged in via a merchant account 236 via the merchant client device 206. This user interface 400 allows the merchant user to play the audio and listen to it. Further, the user interface 400 includes visual components that allow the merchant user to convey satisfaction or dissatisfaction with the audio segment 106. The user interface 400 may also allow the merchant user to make real-time changes to the audio segment 106 and to have the audio segment 106 regenerated.

The user interface 400 may include a summary section 403, which may indicate information such as the item name, a name for the audio segment 106, a length of the audio segment 106, a computer-generated voice type 266 used in the audio segment 106, a background audio type 269 used in the audio segment 106, a tag line used on visual screens of a consumer client device 207, a description of an interactive call to action, and/or other information.

An additional content sources control 406 may be used to specify additional sources of information used to generate the audio segment 106. For example, those additional sources may include a website of the merchant, a social media page of the merchant, and so on. An audio player control 409 is a component that allows the merchant user to cause the merchant client device 206 to play or preview the audio segment 106. The audio player control 409 may have controls such as a play button, a pause button, a stop button, a seek control, and other controls.

A prompt for approval 412 prompts the merchant to express satisfaction or dissatisfaction with the automatically generated audio segment 106. This user generated feedback can then be used to optimize future audio segment generation as a feedback loop into the machine learning model 221 and the audio production system 218. For example, the merchant user can express satisfaction and approve the audio segment 106 to be incorporated into various media content 112 by the audio segment server 227 according to a campaign. The merchant user could also express dissatisfaction and make real-time modifications to aspects of the audio segment 106 (e.g., script 263, computer-generated voice type 266, background audio type 269, etc.), or to trigger the audio production system 218 to execute again to create an entirely new audio segment 106.

The edit script control 415 allows the merchant user to edit the automatically generated script 263, typically to copy edit a few words. A label may cue the user on the estimated duration of the audio segment 106 based on the script 263 as currently edited. For example, the edit script control 415 may be a what-you-see-is-what-you-get (WYSIWYG) editor control. If multiple voices are used, the edit script control 415 may highlight which portions are the respective voice parts, and the edit script control 415 may also allow reassignment or addition of voice parts. A common use case for the edit script control 415 may be for the user to adjust the spelling of words to correct any mispronunciation by the computer-generated voice. In some cases, the user may introduce phonetic spellings to ensure that a word is pronounced correctly. A change voice control 418 may allow the user to select a different computer-generated voice type 266 from the computer-generated voice library 245 using, for example, a drop-down control or another control. A change music control 421 may allow the user to select a different background audio type 269 from the background audio library 248 using, for example, a drop-down control or another control.

A change call-to-action control 424 may allow the user to change an initially selected call-to-action. For example, the call-to-action may be initially configured to prompt the listener to go to a website for the electronic commerce system 215 and to search for the brand name or item name. The user selection could change the call-to-action and allow the merchant to specify a voice interaction call-to-action (e.g., to launch a conversational skill). Different levels of interaction may be specified. For example, a single-turn interaction may simply prompt the listener to say "send more information." A multi-turn interaction would start a conversational voice experience, where the response from the voice interface device may be, for example, "Would you like to hear about the company, the product features, or offers?"

Figure 5:
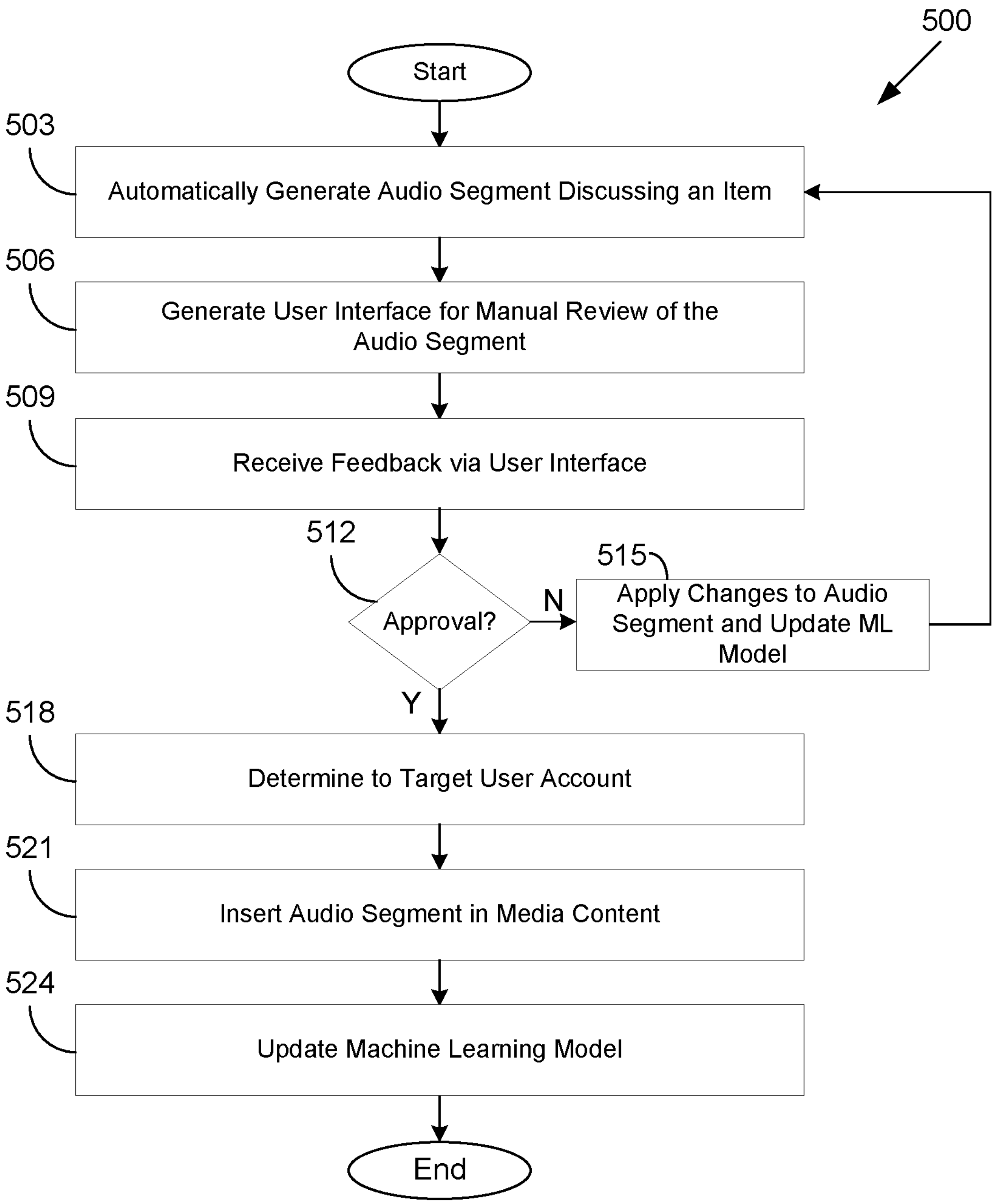
FIG. 5 is a flowchart illustrating one example of functionality implemented in a computing environment in the networked environment of FIG. 2 according to various embodiments of the present disclosure.

Referring next to FIG. 5, shown is a flowchart 500 that provides one example of the operation of components of the computing environment 203 according to various embodiments. It is understood that the flowchart 500 provides merely an example of the many different types of functional arrangements that may be employed to implement the operation of the components of the computing environment 203 described herein. As an alternative, the flowchart 500 may be viewed as depicting an example of elements of a method implemented in the computing environment 203 according to one or more embodiments.

Beginning with box 503, the audio production system 218 automatically generates an audio segment 106 discussing an item. For example, a merchant user associated with a merchant account 236 and using a merchant client device 206 may log into a management portal of the electronic commerce system 215, and the user may select a particular item or items from their catalog for generating an audio segment 106 discussing the particular item or items. In another example, the electronic commerce system 215 or another system may automatically and prospectively initiate generation of audio segments 106 in order to encourage merchant users to utilize audio segments 106 as part of their marketing plan. Although the example is of a merchant user herein, in other examples, the user may be associated with an entity who may be a merchant or non-merchant but who is responsible for promotion of an item offered via the electronic commerce system 215.

The audio segment 106 is generated by the audio production system 218 using one or more audio segment generation rules 251 based at least in part on item data 103 associated with the item in the electronic commerce system 215, which may include, for example, a customer review of the item, detail page information of the item, and other data. Additionally, a network site or network page of the merchant may be used to assist theming and development of scripts 263 for the audio segment 106. In some examples, the machine learning model 221 is used in generating the audio segment 106, to include generating the script 263, selecting a computer-generated voice type 266, selecting a background audio type 269, specifying the volume, specifying fade in and fade out parameters for the background audio, determining the length of the audio segment 106, and/or other characteristics of the audio segment 106.

In generating the audio segment 106, a script generation module 303 may generate the script 263, a translation module 306 may translate the script 263 into a different language or may translate source data from the item data 103 into a different language, a voice rendering module 309 may generate a voice track with one or more voices reading the script 263, a background audio module 312 may select particular background audio from the background audio library 248, a file generation module 315 may generate the audio data 257 for the audio segment 106, and the metadata and interactivity enablement module 318 may generate the metadata 260 and/or interactivity data for the audio segment 106, and so forth.

In box 506, the audio preview system 224 generates a user interface 400 for manually reviewing or previewing the automatically generated audio segment 106. The user interface 400 may present summary information for the audio segment 106, facilitate playback of a preview of the audio segment 106 by the merchant client device 206, allow the user to make changes to the audio segment 106, allow the user to express approval or disapproval of the audio segment 106, and/or perform other actions.

In box 509, the audio preview system 224 receives user feedback via the user interface 400. For example, the user may express approval or disapproval of the audio segment 106, or the user may submit one or more changes to the audio segment 106 and a subsequent approval of the audio segment 106 with the requested change(s).

In box 512, it is determined whether the user has approved the audio segment 106 via the user interface 400. If the user has not approved the audio segment 106, in box 515, the audio preview system 224 may cause the audio production system 218 to make one or more changes to the audio segment 106 as requested via the user interface 400. In addition, the machine learning model 221 may be updated based upon the feedback of disapproval and or the change(s) specified by the user. In other words, the machine learning model 221 may be trained to avoid generating the audio segments 106 in the same way when users express disapproval. Subsequently, operation of the flow chart returns to box 503, and the audio production system 218 regenerates the audio segment 106 based at least in part on the specified changes. And other examples, the audio production system 218 may completely regenerate a new audio segment 106.

If instead the user submits an approval of the automatically generated audio segment 106, the flowchart 500 moves from box 512 to box 518. In box 518, the audio segment server 227 determines to target one or more user accounts 233. The user accounts 233 may be targeted based on a correlation of characteristics of the item or merchant (e.g., category, price, regional applicability, demographic applicability) with characteristics associated with the user accounts 233 (e.g., demographics, interests, location, and so on).

In box 521, the audio segment server 227 causes the audio segment 106 to be inserted into media content 112 via the content delivery system 230 that is streaming the media content 112 to the consumer client device 107. The insertion of the media content 112 may be controlled based at least in part on the audio segment insertion rules 254 and/or the machine learning model 221. Also, the specific media content 112 may be selected based upon a comparison of characteristics associated with the media content 112 and characteristics associated with the item or merchant.

In box 524, the machine learning model 221 is updated based at least in part upon the approval of the audio segment 106 and/or upon the effectiveness of the audio segment 106 as determined by comparing and correlating the impressions of the audio segment 106 with any conversions such as an ordering of the item discussed in the audio segment 106. For example, generation of audio segments 106 that are more effective in producing conversions may be rewarded in the machine learning model 221, while generation of audio segments 106 that are less effective in producing conversions may be penalized in the machine learning model 221. Thereafter, the operation of the flowchart 500 ends.

Figure 6:
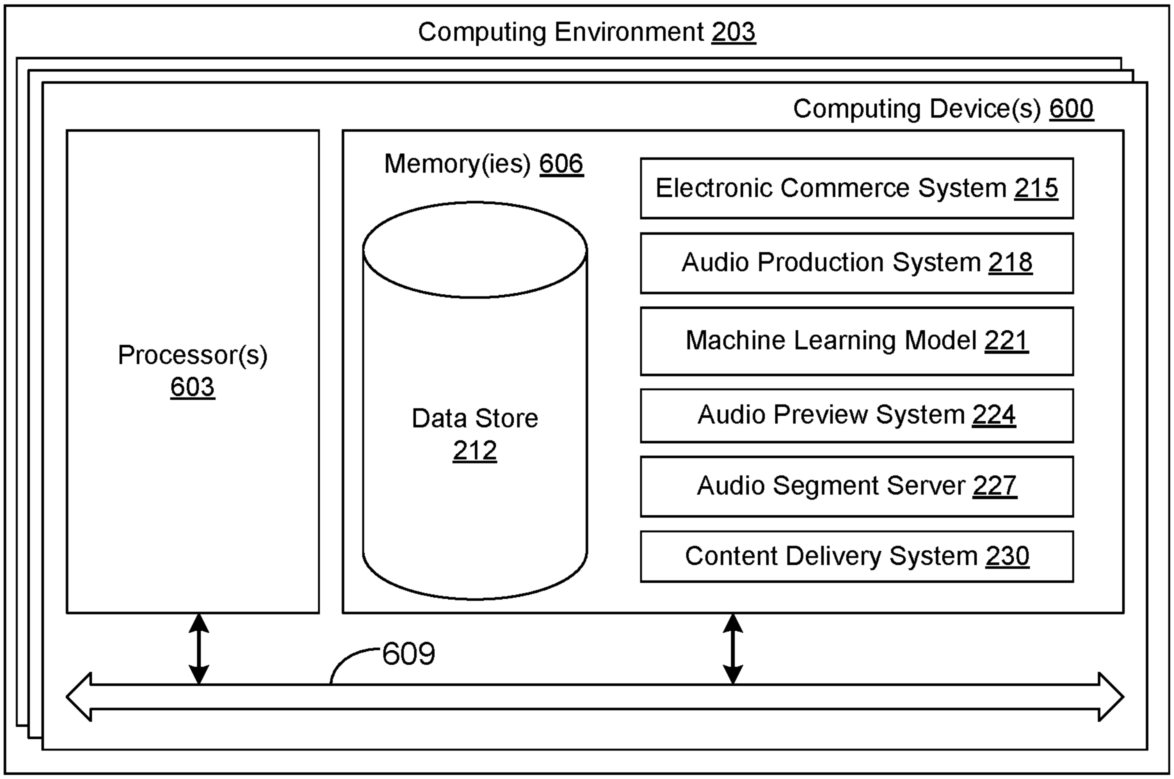
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the electronic commerce system 215, the audio production system 218, the machine learning model 221, the audio preview system 224, the audio segment server 227, the content delivery system 230, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce system 215, the audio production system 218, the machine learning model 221, the audio preview system 224, the audio segment server 227, the content delivery system 230, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart 500 shows the functionality and operation of an implementation of portions of the electronic commerce system 215, the audio production system 218, the machine learning model 221, the audio preview system 224, the audio segment server 227, and the content delivery system 230. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart 500 shows a specific order of execution, it is understood that the order of execution may differ from that which is depicted. For example, the order of execution of two or more blocks may be scrambled relative to the order shown. Also, two or more blocks shown in succession in the flowchart 500 may be executed concurrently or with partial concurrence. Further, in some embodiments, one or more of the blocks shown in the flowchart 500 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, the audio production system 218, the machine learning model 221, the audio preview system 224, the audio segment server 227, and the content delivery system 230, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 215, the audio production system 218, the machine learning model 221, the audio preview system 224, the audio segment server 227, and the content delivery system 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
instructions executable in the at least one computing device, wherein when executed the instructions cause the at least one computing device to at least:
automatically generate an audio segment with synthetic speech discussing an item offered by an entity via an electronic commerce system, the audio segment being generated by a machine learning model based at least in part on data associated with the item in the electronic commerce system, the data including at least one of: a customer review of the item or detail page information of the item;
generate a user interface that facilitates manually reviewing the audio segment by the entity;
receive one or more changes to the audio segment from the entity via the user interface;
modify the audio segment before inserting the audio segment in media content based at least in part on the one or more changes;
update the machine learning model based at least in part on the one or more changes;

insert the audio segment in the media content in response to an approval of the audio segment by the entity via the user interface; and update the machine learning model based at least in part on the approval of the audio segment.

2. The system of claim 1, wherein the media content comprises a video stream, and an image of the item is shown in the video stream during the audio segment.

3. The system of claim 1, wherein the instructions further cause the at least one computing device to at least automatically generate a script for the audio segment using one or more words extracted from the customer review.

4. The system of claim 1, wherein the instructions further cause the at least one computing device to at least automatically generate a script for the audio segment based at least in part on a machine translation of the data associated with the item in the electronic commerce system from a first language to a second language.

5. The system of claim 1, wherein the instructions further cause the at least one computing device to at least automatically select a particular type of computer-generated voice from a plurality of types of computer-generated voice.

6. The system of claim 1, wherein the instructions further cause the at least one computing device to at least update the machine learning model based at least in part on a disapproval of another audio segment by the entity via the user interface.

7. The system of claim 1, wherein the instructions further cause the at least one computing device to at least:

determine whether a user account ordered the item via the electronic commerce system after having been presented with the media content; and update the machine learning model based at least in part on whether the user account ordered the item.

8. The system of claim 1, wherein the one or more changes comprise at least one of: a change to a script for the audio segment, a change to a type of computer-generated voice used in the audio segment, a change to a background music used in the audio segment, or a change to a call-to-action used in the audio segment.

9. A computer-implemented method, comprising:

automatically generating an audio segment with synthetic speech discussing an item offered by an entity via an electronic commerce system, the audio segment being generated based at least in part on data associated with the item in the electronic commerce system;

generating a user interface that facilitates manually reviewing the audio segment by the entity; and inserting the audio segment in media content in response to an approval of the audio segment by the entity via the user interface, wherein inserting the audio segment in the media content further comprises:

determining a user device to target with the audio segment based at least in part on a machine learning model and one or more characteristics associated with the user device;

inserting the audio segment in the media content being transmitted to the user device; and updating the machine learning model based at least in part on whether an account associated with the user device has ordered the item after the audio segment has been transmitted to the user device.

10. The computer-implemented method of claim 9, wherein data associated with the item in the electronic commerce system includes one or more customer reviews of the item.

11. The computer-implemented method of claim 9, wherein the audio segment is generated further based at least in part on data extracted from a network site of the entity separate from the electronic commerce system.

12. The computer-implemented method of claim 9, wherein automatically generating the audio segment further comprises applying the data associated with the item in the electronic commerce system to a machine learning model optimized for audio segment generation.

13. The computer-implemented method of claim 9, further comprising:

receiving one or more changes to the audio segment from the entity via the user interface, the one or more changes comprising at least one of: a change to a script for the audio segment, a change to a type of computer-generated voice used in the audio segment, a change to a background music used in the audio segment, or a change to a call-to-action used in the audio segment; and updating a machine learning model used in generating the audio segment based at least in part on the one or more changes.

14. The computer-implemented method of claim 9, further comprising:

determining whether a user account has ordered the item after having been presented with the audio segment; and updating a machine learning model used in generating the audio segment based at least in part on whether the user account has ordered the item after having been presented with the audio segment.

15. The computer-implemented method of claim 9, wherein automatically generating the audio segment further comprises automatically generating a script for the audio segment based at least in part on the data associated with the item in the electronic commerce system.

16. The computer-implemented method of claim 9, wherein automatically generating the audio segment further comprises automatically selecting a type of computer-generated voice for the audio segment based at least in part on the data associated with the item in the electronic commerce system.

17. The computer-implemented method of claim 9, wherein automatically generating the audio segment further comprises automatically selecting a type of background music for the audio segment based at least in part on the data associated with the item in the electronic commerce system.

18. A non-transitory computer-readable medium embodying a program executable in at least one computing device, wherein when executed the program causes the at least one computing device to at least:

automatically generate an audio segment with synthetic speech discussing an item offered by an entity via an electronic commerce system, the audio segment being generated by a machine learning model based at least in part on data associated with the item in the electronic commerce system;

facilitate a preview of the audio segment by the entity via a user interface;

receive a disapproval of the audio segment from the entity via the user interface;

update the machine learning model based at least in part on the disapproval;

receive one or more changes to the audio segment from the entity via the user interface; and update the machine learning model based at least in part on the one or more changes.

19. The non-transitory computer-readable medium of claim 18, wherein the one or more changes comprise at least one of: a change to a script for the audio segment, a change to a type of computer-generated voice used in the audio segment, a change to a background music used in the audio segment, or a change to a call-to-action used in the audio segment.

* * * * *